May 7, 1963

R. J. LEWIS 3,088,199

TIRE TOOL

Filed Oct. 25, 1960

*INVENTOR.*
RICHARD J. LEWIS

BY J. B. Holden
ATTORNEY

United States Patent Office 3,088,199
Patented May 7, 1963

3,088,199
TIRE TOOL
Richard J. Lewis, Uniontown, Ohio, assignor to The Goodyear Tire & Rubber Company, Akron, Ohio, a corporation of Ohio
Filed Oct. 25, 1960, Ser. No. 64,914
3 Claims. (Cl. 29—221.5)

This invention relates to a tool for use in dismounting a tire and tube and more particularly to a tool to push the valve stem of the tube through the hole in the rim base during the dismounting operation.

In the dismounting of a tire and tube from a rim, it is sometimes very difficult to push the valve stem through the hole in the rim base, particularly with long bent valve stems that are close to the base and extend toward the edge of the rim. It is essential when dismounting a tire and tube that the valve stem lie completely outside the rim base so as to be between the beads of the tire. Various tools or techniques have been used by the operators to accomplish this but a single, effective tool has not been available.

The need for such a tool is particularly important when a great number of tire and tube assemblies must be dismounted if the operation is to be efficient. Such a tool must be adaptable to different sizes of rims and also the different locations of the valve holes in the rim base. It is therefore an object of this invention to provide a simple, economical tool to push a valve stem of a tube through the hole in the rim base prior to dismounting a tire and tube assembly.

Another object of the invention is to provide a tool that may be adjusted to fit a variety of rim sizes and valve hole locations.

A further object of the invention is to provide a tool that displaces the valve stem from the tool after it has been pushed through the valve hole in the rim base.

A still further object of the invention is to provide a tool that readily maintains its position on the rim base while being used.

These and other objects of this invention will appear hereinafter as the description thereof proceeds, the novel features, arrangements and combinations being clearly pointed out in the claims hereunto appended.

Figure 1:
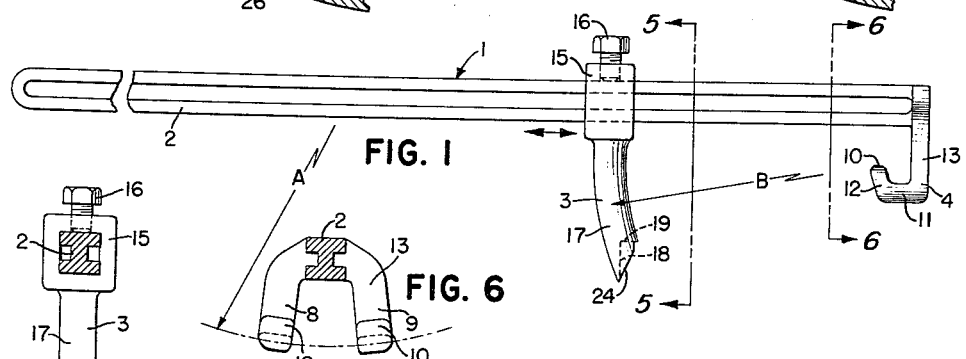
FIG. 1 is an elevation of the tool of the invention.
Figures 5, 6:
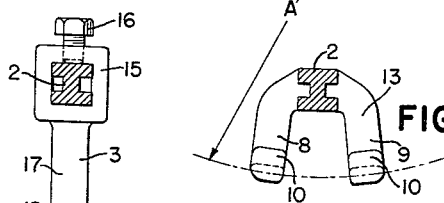
FIG. 5 is a section taken on line 5—5 of FIG. 1.
FIG. 6 is a section taken on line 6—6 of FIG. 1.

In FIG. 1, the tool 1 is made up of three basic parts, the lever arm 2, a valve pushing member 3 and a fulcrum member 4. The lever member 2 as seen in FIGS. 5 and 6 is of a square I section to provide rigidity and strength and also serve as means to keep the pusher member 3 in the proper relation thereto when it is moved along the lever member to adjust the position thereof. The length of the lever member may be of any desired length so that it will provide sufficient leverage for ease of operation by the operator when pushing the valve stem 5 through the valve hole 6 of the rim base 7, but in any event the length must be less than the diameter of the rim so that it may be manipulated inside the rim during use.

Figure 2:
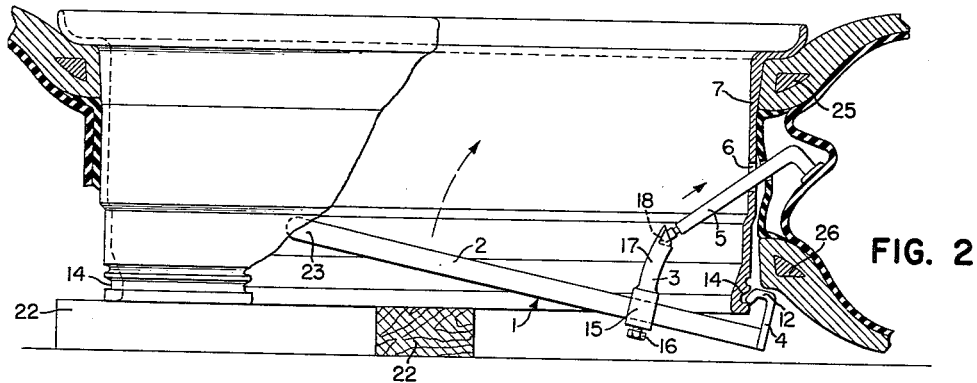
FIGS. 2, 3 and 4 are partial sections illustrating typical positions of the tool during use.

To one end of the lever arm 2, fulcrum member 4 is fixed. As shown, fulcrum member 4 is bifurcated, as best seen in FIG. 6, with the two bifurcated portions 8 and 9 lying on opposite sides of lever arm 2. The rim-engaging portion 10 on each of the portions 8 and 9 preferably lies on an arc having a radius (a) approximating that of the rim with which the tool is most commonly used to stabilize the tool and prevent tilting when it is being used. The bifurcated fulcrum member 4 is substantially J-shaped in cross-section as best seen in FIG. 1, and attached to the end of lever arm 2 so that the foot 11 of the J faces toward the opposite end of lever arm 2. The up-turned portion 12 of the foot portion 11 is spaced from the vertical leg 13 a distance sufficient to permit the up-turned portion 12 to drop into the gutter 14 of the rim base 7 as the tool is used to push the valve stem 5 through hole 6 in the rim base 7. As best seen in FIG. 2, up-turned portion 12 is of a length so that the end thereof will engage a portion of the outer edge of gutter 14 when tool 1 is initially positioned for use.

The valve pusher member 3 in the form shown, includes a lever-engaging portion 15 to slide over lever arm 2. A set screw 16 is mounted in the upper part of lever-engaging portion 15 to tighten against lever arm 2 when it is desired to fix the position thereon. Extending from lever-engaging portion 15 is a valve pusher stem 17 which is substantially normal to lever arm 2 at lever-engaging portion 15 and projects therefrom in an arcuate path toward the end of lever arm 2 on which fulcrum member 4 is attached. The radius (B) of pusher stem 17 is preferably that of the distance between the edge of the rim base 7 and valve hole 6 in the most commonly used rim. As shown, valve pusher stem 17 is of round cross-section and of a smaller diameter than valve hole 6 in the rim base so that it will readily pass therethrough during use of the tool.

Figure 7:
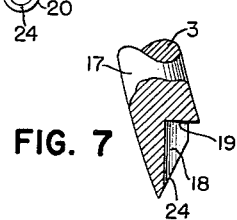
FIG. 7 is an enlarged break-away section of a portion of FIG. 1.
Figure 8:
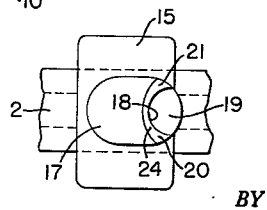
FIG. 8 is a bottom elevation of a portion of FIG. 4.

In order that the end of tube valve stem 5 may properly seat on the end of pusher stem 17, preferably the end of pusher stem 17 is bevelled at a substantial angle to the axis of pusher stem 17 with the bevelled surface facing fulcrum member 4, the purpose of which will be explained later. An axially extending recess 18 is formed in the bevelled end of pusher stem 17 so that base 19 of recess 18 lies parallel to lever arm 2. Preferably recess 18 is arcuate in configuration when viewed from the end as seen in FIGS. 7 and 8 so that shoulder portions 20 and 21 extend around the sides of recess 18 to prevent valve stem 5 from slipping laterally during use. The recess 18 faces toward the fulcrum member 4 when valve pusher 3 is in the position on lever member 2.

Figure 3:
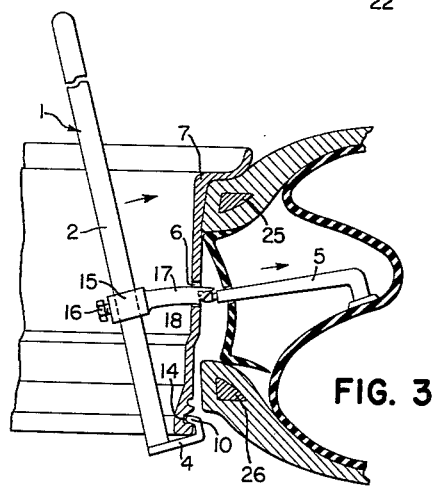
Figure 4:
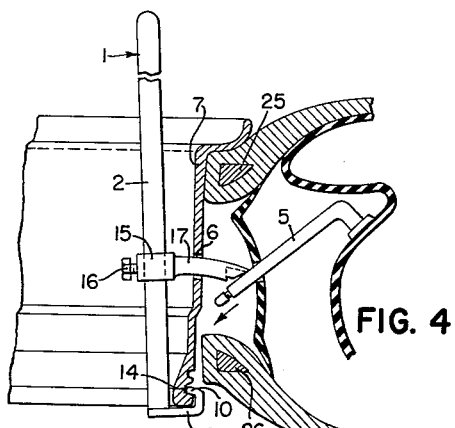

In operation of the tool the tire and rim preferably are placed on a support 22 or blocks to provide clearance between the rim and floor. The valve pusher member 3 is adjusted on the lever arm 2 so that valve pusher stem 17 will pass through valve hole 6 in the rim base 7 when in the position illustrated by FIGS. 3 and 4. After this adjustment is made, up-turned portion 12 of fulcrum member 4 is placed in gutter 14 with the tool in the position substantially as shown in FIG. 2. Then the end of valve stem 5 is placed in position in recess 18 and the resilience caused by the distortion of the tube in positioning valve stem 5 retains valve stem 5 in firm engagement on the recess 18. The operator then rotates the tool 1 around fulcrum 4 by lifting the end 23 of the lever arm 2 in the direction indicated by the arrow in FIG. 2 and as the end of valve pusher stem 17 approaches rim base 7, it passes through valve hole 6 as best seen in FIG. 3, moving valve stem 5 through the hole ahead of it. Shortly after the end of pusher stem 17 passes through valve hole 6, end 24 of the bevelled portion of valve pusher stem 17 engages valve stem 5 to tilt it out of recessed portion 18 which causes valve stem 5 to then be completely within the tire and between beads 25 and 26. It cannot return through the hole in rim base 7, as valve pusher stem 17 is still therein and valve stem 5 is completely out of position with respect to valve hole 6. The valve tool 1 is then removed from rim base 7 and the tire dismounted by the usual procedure. The base 19 of recess 18 at the end of valve pusher stem 17, since it is parallel to lever arm 2, causes recess 18 to be slightly undercut as it passes through hole 6 in rim base 7 to prevent the end of valve stem 5 from being displaced from recess 18 until pusher stem 17 has passed through hole 6 in rim base 7. Due to this feature, tool 1 provides a positive holding of valve stem 5 in position until it is moved through hole 6 in rim base 7 during the mounting operation. At that point, it is automatically pushed by end 24 of the bevelled portion from recess 18 to thus remove it from tool 1. At this point the tire is ready for dismounting.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A tool for pushing a valve stem of an inner tube through the valve hole in a gutter-edge rim base prior to dismounting a tire and tube assembly from the rim, said tool comprising a lever member, a rim-engaging member attached to one end of said lever member to engage the gutter portion of the rim base to provide a fulcrum for leverage action of the lever member and to maintain the tool in position as the lever member is moved toward the rim base, and a valve-pushing member adjustably movable along said lever arm between the ends thereof having a valve-engaging portion extending substantially normal to said lever member and in an arcuate configuration toward the rim-engaging member, the radius of the arc being equal to the approximate distance of the valve hole from the gutter of the rim base with which the tool is most commonly used, said valve-engaging portion being of a diameter less than that of the valve hole in said rim base with the end thereof bevelled at a substantial angle to the length whereby the bevelled portion generally faces toward the rim-engaging member and the bevelled face having an axially extending recess formed therein to provide a seat for the end of the valve stem, the base of said recess being parallel to the lever member with the end of the bevelled portion engaging the valve stem to push the stem therefrom after the valve pushing member passes through the valve hole.

2. A tool for pushing a valve stem of an inner tube through the valve hole in a gutter-edge rim base prior to dismounting a tire and tube assembly from the rim, said tool comprising a lever member, a J-shaped rim-engaging member attached to one end of said lever member with the foot of the J facing the opposite end of the lever member and the up-turned portion thereof engaging the gutter portion of the rim base to provide a fulcrum for leverage action of the lever member and to maintain the tool in position as the lever member is moved toward the rim base, and a valve-pushing member adjustably movable along said lever arm between the ends thereof having a valve-engaging portion extending substantially normal to said lever member and in an arcuate configuration toward the rim-engaging member, the radius of the arc being equal to the approximate distance of the valve hole from the gutter of the rim base with which the tool is most commonly used, said valve-engaging portion being of a diameter less than that of the valve hole in said rim base with the end thereof bevelled at a substantial angle to the length whereby the bevelled portion generally faces toward the rim-engaging member and the bevelled face having an axially extending recess formed therein to provide a seat for the end of the valve stem, the base of said recess being parallel to the lever member with the end of the bevelled portion engaging the valve stem to push the stem therefrom after the valve pushing member passes through the valve hole.

3. A tool for pushing a valve stem of an inner tube through the valve hole in a gutter-edge rim base prior to dismounting a tire and tube assembly from the rim, said tool comprising a lever member, a bifurcated J-shaped rim-engaging member attached to one end of said lever member with the foot of the J facing the opposite end of the lever member and the up-turned portion thereof engaging the gutter portion of the rim base to provide a fulcrum for leverage action of the lever member and to maintain the tool in position as the lever member is moved toward the rim base, the spaced portions of the bifurcated member lying on opposite sides of said lever member in an arcuate position on a radius substantially that of the rim base, and a valve-pushing member adjustably movable along said lever arm between the ends thereof having a valve-engaging portion extending substantially normal to said lever member and in an arcuate configuration toward the rim-engaging member, the radius of the arc being equal to the approximate distance of the valve hole from the gutter of the rim base with which the tool is most commonly used, said valve-engaging portion being of a diameter less than that of the valve hole in said rim base with the end thereof bevelled at a substantial angle to the length whereby the bevelled portion generally faces toward the rim-engaging member and the bevelled face having an axially extending recess formed therein to provide a seat for the end of the valve stem, the base of said recess being parallel to the lever member with the end of the bevelled portion engaging the valve stem to push the stem therefrom after the valve pushing member passes through the valve hole.

References Cited in the file of this patent

UNITED STATES PATENTS

| | | |
|---|---|---|
| 1,345,651 | Wilgus | July 6, 1920 |
| 1,421,987 | Quinn | July 4, 1922 |
| 2,492,482 | Kendall | Dec. 27, 1949 |
| 2,629,584 | Cannon | Feb. 24, 1953 |
| 2,921,368 | De Lucia | Jan. 19, 1960 |
| 2,947,073 | Boyer | Aug. 2, 1960 |